US009779229B2

(12) United States Patent
Rooyakkers et al.

(10) Patent No.: US 9,779,229 B2
(45) Date of Patent: Oct. 3, 2017

(54) SECURE INDUSTRIAL CONTROL SYSTEM

(71) Applicant: Bedrock Automation Platforms Inc., San Jose, CA (US)

(72) Inventors: Albert Rooyakkers, Sunnyvale, CA (US); James G. Calvin, Attleboro, MA (US); Samuel Galpin, Westford, MA (US); Timothy Clish, Taunton, MA (US)

(73) Assignee: Bedrock Automation Platforms Inc., San Jose, CA (US)

( * ) Notice: Subject to any disclaimer, the term of this patent is extended or adjusted under 35 U.S.C. 154(b) by 0 days.

(21) Appl. No.: 14/942,305

(22) Filed: Nov. 16, 2015

(65) Prior Publication Data

US 2016/0078213 A1 Mar. 17, 2016

Related U.S. Application Data

(63) Continuation of application No. 14/469,931, filed on Aug. 27, 2014, now Pat. No. 9,191,203, which is a (Continued)

(51) Int. Cl.
*G06F 21/44* (2013.01)
*H04L 9/08* (2006.01)
(Continued)

(52) U.S. Cl.
CPC .......... *G06F 21/44* (2013.01); *G06F 21/6218* (2013.01); *H04L 9/083* (2013.01); *H04L 9/3263* (2013.01); *G06F 2212/175* (2013.01)

(58) Field of Classification Search
CPC ... G06F 21/44; G06F 2212/175; H04L 9/083; H04L 9/3263
See application file for complete search history.

(56) References Cited

U.S. PATENT DOCUMENTS 6,219,789 B1 4/2001 Little et al.
6,480,963 B1 11/2002 Tachibana et al.
(Continued)

FOREIGN PATENT DOCUMENTS

CN 102480352 A 5/2012
JP 3370931 B2 11/1999
(Continued)

OTHER PUBLICATIONS

Keith, S. et al., "Guide to Industrial Control Systems (ICS) Security," NIST, Special Pub. 800-82, Jun. 2011, (refer to pp. 2-1 to 2-10).

(Continued)

*Primary Examiner* — Robert Leung
(74) *Attorney, Agent, or Firm* — Advent, LLP

(57) ABSTRACT

A secure industrial control system is disclosed herein. The industrial control system includes a plurality of industrial elements (e.g., modules, cables) which are provisioned during manufacture with their own unique security credentials. A key management entity of the secure industrial control system monitors and manages the security credentials of the industrial elements starting from the time they are manufactured up to and during their implementation within the industrial control system for promoting security of the industrial control system. An authentication process, based upon the security credentials, for authenticating the industrial elements being implemented in the industrial control system is performed for promoting security of the industrial control system. In one or more implementations, all industrial elements of the secure industrial control system are provisioned with the security credentials for providing security at multiple (e.g., all) levels of the system.

20 Claims, 7 Drawing Sheets

Related U.S. Application Data continuation of application No. PCT/US2013/053721, filed on Aug. 6, 2013.

(51) Int. Cl.
*H04L 9/32* (2006.01)
*G06F 21/62* (2013.01)

(56) References Cited

U.S. PATENT DOCUMENTS

| | | |
|---|---|---|
| 6,643,777 B1 | 11/2003 | Chu |
| 7,660,998 B2 | 2/2010 | Walmsley |
| 7,746,846 B2 | 6/2010 | Boora et al. |
| 7,822,994 B2 | 10/2010 | Hamaguchi |
| 7,971,052 B2 | 6/2011 | Lucas et al. |
| 8,032,745 B2 | 10/2011 | Bandholz et al. |
| 8,132,231 B2 | 3/2012 | Amies et al. |
| 8,181,262 B2 | 5/2012 | Cooper et al. |
| 2002/0095573 A1 | 7/2002 | O'Brien |
| 2002/0097031 A1 | 7/2002 | Cook et al. |
| 2005/0102535 A1 | 5/2005 | Patrick et al. |
| 2005/0144437 A1 | 6/2005 | Ransom et al. |
| 2005/0229004 A1 | 10/2005 | Callaghan |
| 2008/0077976 A1 | 3/2008 | Schulz |
| 2009/0083843 A1 | 3/2009 | Wilkinson, Jr. et al. |
| 2009/0091513 A1* | 4/2009 | Kuhn .................. G09F 9/33 345/4 |
| 2009/0092248 A1* | 4/2009 | Rawson .................. G06F 21/31 380/45 |
| 2012/0102334 A1 | 4/2012 | O'Loughlin et al. |
| 2012/0236769 A1 | 9/2012 | Powell et al. |
| 2014/0095867 A1* | 4/2014 | Smith .................. H04L 9/0822 713/164 |

FOREIGN PATENT DOCUMENTS

| | | |
|---|---|---|
| JP | 2003216237 A | 7/2003 |
| JP | 200538411 A | 2/2005 |
| JP | 1439340 B2 | 11/2005 |
| JP | 200660779 A | 3/2006 |
| JP | 2006238274 A | 9/2006 |
| JP | 2007096817 A | 4/2007 |
| KR | 20020088540 A | 11/2002 |
| KR | 20050014790 A | 2/2005 |
| KR | 20060034244 A | 4/2006 |
| KR | 100705380 B1 | 4/2007 |
| TW | 201310344 A | 3/2013 |
| WO | 2005070733 A1 | 8/2007 |

OTHER PUBLICATIONS

International Search Report mailed May 12, 2014 for PCT/US2013/053721.
Office Action dated Jun. 28, 2017 for Japanese Appln. No. 2016-533280.

* cited by examiner

SECURE INDUSTRIAL CONTROL SYSTEM

CROSS-REFERENCE TO RELATED APPLICATIONS

The present application is a continuation of U.S. patent application Ser. No. 14/469,931, titled "SECURE INDUSTRIAL CONTROL SYSTEM" filed Aug. 27, 2014, which is a continuation of International Patent Application No. PCT/US2013/053721, titled "SECURE INDUSTRIAL CONTROL SYSTEM" filed Aug. 6, 2013. U.S. patent application Ser. No. 14/469,931 and International Patent Application No. PCT/US2013/053721 both incorporated herein by reference, in their entirety.

BACKGROUND

Industrial control systems (ICS), which may include process control systems (PCS), distributed control systems (DCS), programmable logic controller (PLC)-based systems supervisory control and data acquisition (SCADA) systems, and the like are instrumental in the production of goods and provision of essential services. Using information collected from remote stations in an industrial or infrastructure environment, automated and/or operator-driven supervisory commands can be transmitted to remote station control devices. These control devices can control various local operations, such as opening and/or closing valves and circuit breakers, operating solenoids, collecting data from sensor systems, and monitoring a local environment for alarm conditions.

SUMMARY

A secure industrial control system is disclosed. In one or more implementations, the secure industrial control system includes a security credential source, a security credential implementer, and at least two industrial elements. The security credential source is configured to generate unique security credentials. The security credential implementer is configured to provision respective ones of the at least two industrial elements with a unique security credential generated by the security credential source.

In one or more implementations, the secure industrial control system includes at least one control module provisioned with a first unique security credential. The system further includes at least one input/output module provisioned with a second unique security credential. The at least one control module and the at least one input/output module are operable to bi-directionally communicate with one another based on the first and second unique security credentials.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Figure 1:
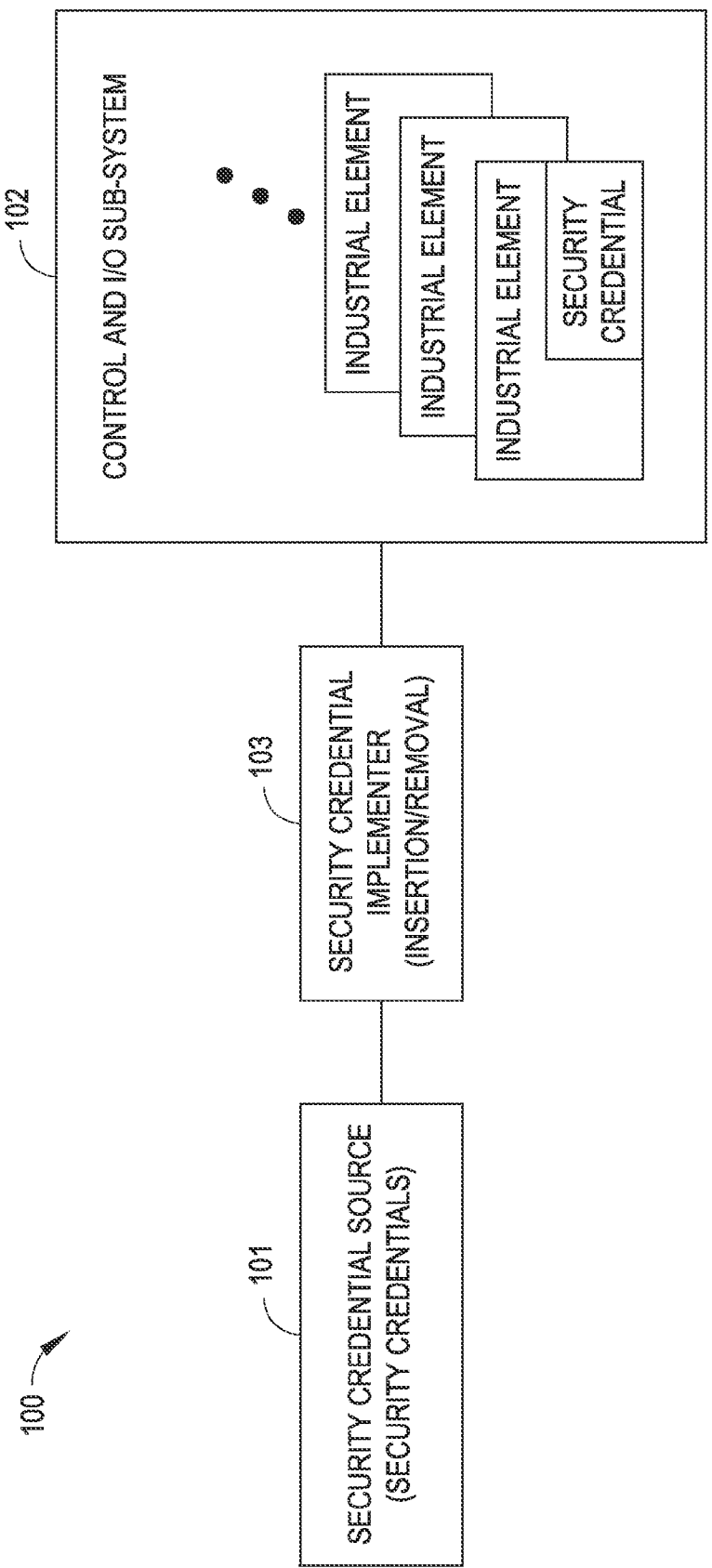
FIG. 1 is a conceptual block diagram illustrating a secure industrial control system in accordance with example implementations of the present disclosure.
Figure 2:
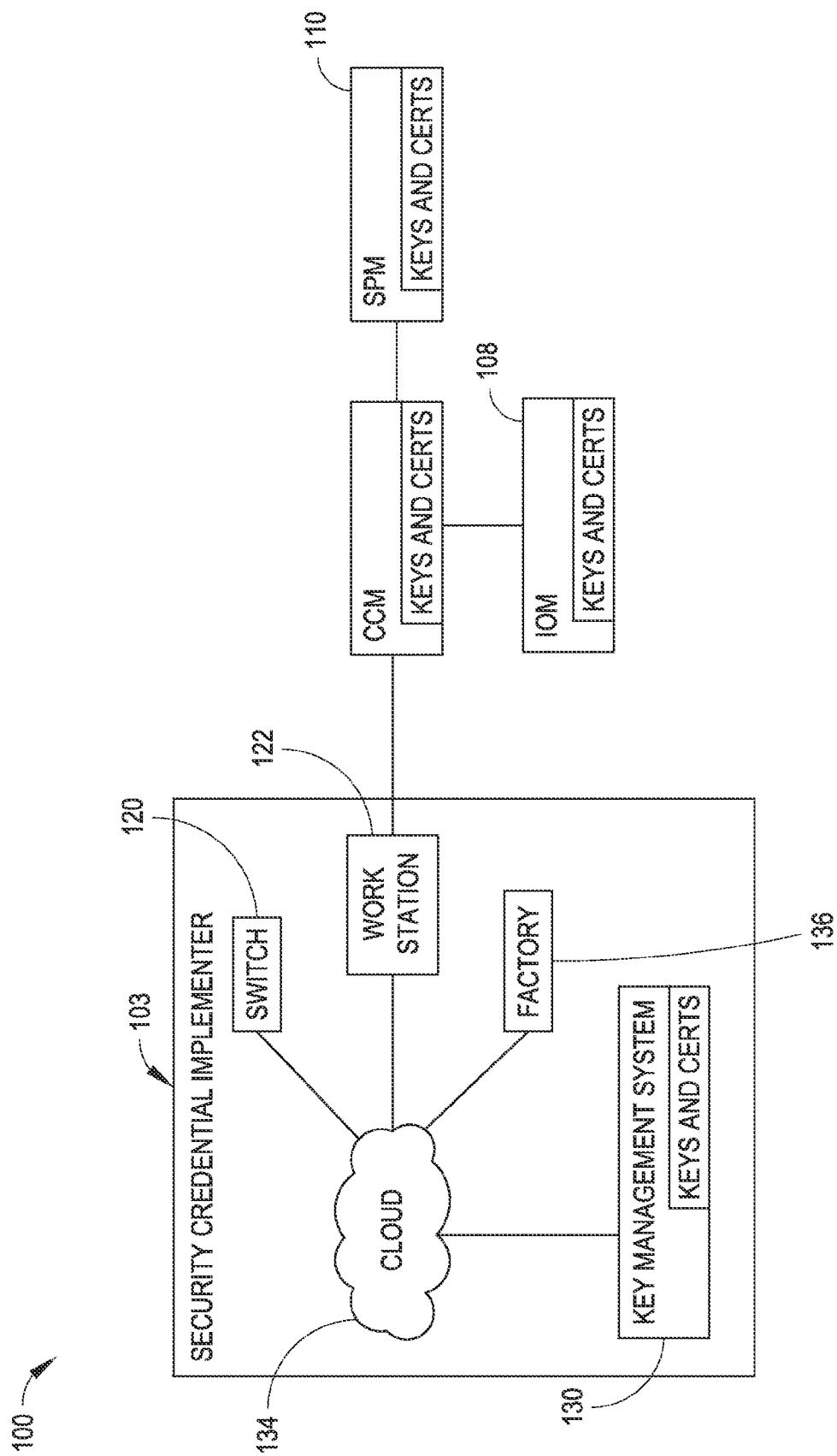
FIG. 2 is a conceptual block diagram illustrating features of the secure industrial control system shown in FIG. 1 in accordance with an example implementation of the present disclosure.
Figure 3:
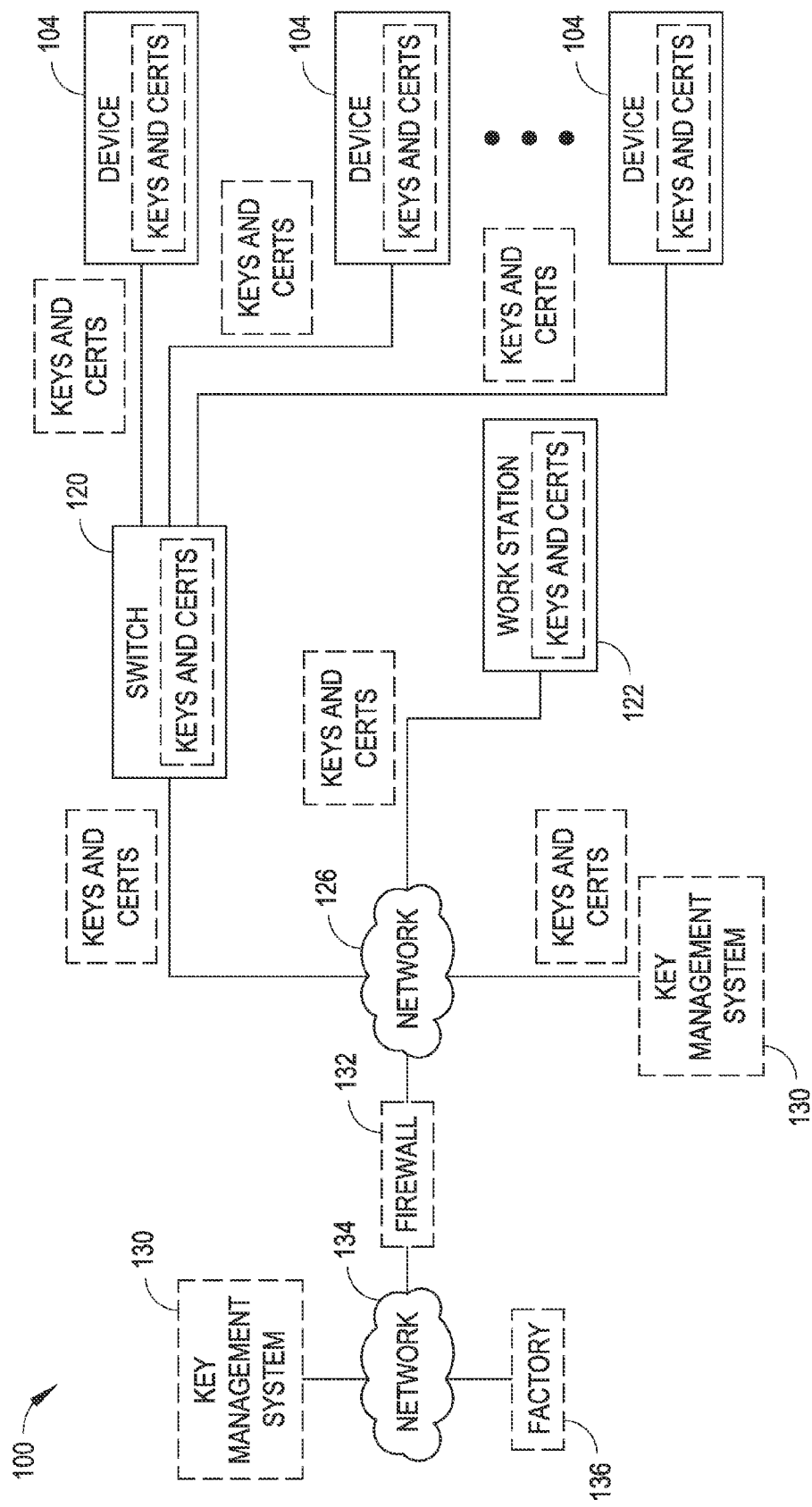
FIG. 3 is a conceptual block diagram illustrating aspects of the secure industrial control system shown in FIG. 1 in accordance with example implementations of the present disclosure.

Securing cyber-to-physical systems requires the integration of design and planning, as well as the efforts of operating engineers having cyber security and support skills. Industrial control systems (ICS) were initially envisioned to operate in isolated and trusted domains. However, expanded connectivity technology has boosted productivity, allowed for leveraging of information from both a plant floor and from around the world, thereby leaving ICS potentially exposed to a larger number of people. Unfortunately, this expanded connectivity technology has outpaced corresponding cyber security solutions and has taxed people with the engineering understanding and security skills to keep critical systems safe from advanced cyber threats.

A secure industrial control system is disclosed herein. In one or more implementations, the secure industrial control system includes a security credential source, a security credential implementer, and industrial elements of the industrial control system. In embodiments, the industrial elements may include a control module (e.g., communications control module) and an input/output module. The security credential source is configured to generate unique security credentials (e.g., keys, certificates, etc.). The security credential implementer is configured to provision the industrial elements with the unique security credential generated by the security credential source. For instance, the communications control module and the input/output module may each be provisioned with unique security credentials. An authentication process for authenticating the industrial elements implemented in the industrial control system may be performed based upon the security credentials. For example, in embodiments, the communications control module and the input/output module may be operable to bi-directionally communicate with one another based on the security credentials (e.g., based upon the authentication process). Further, in the secure industrial control system disclosed herein, multiple (e.g., every) industrial elements (e.g., module, power supply, physical interconnect device, etc.) of the system may be provisioned with security credentials for providing security at multiple (e.g., all) levels of the system. Still further, the industrial elements may be provisioned with the security credentials (e.g., keys, certificates, etc.) during manufacture (e.g., at birth), and may be managed from birth by a key management entity of the industrial control system for promoting security of the industrial control system.

Example Industrial Control System(s)

Referring generally to FIGS. 1 through 5, an example industrial control system (ICS) (e.g., a secure industrial control system) 100 is described in accordance with example implementations of the present disclosure. The term "industrial control system" as used herein may encompass several types of control systems used in industrial production, including process control systems (PCS), supervisory control and data acquisition (SCADA) systems, distributed control systems (DCS), and other smaller control system configurations such as programmable logic controllers (PLC) often found in the industrial sectors and critical infrastructures. The industrial control system 100 may be implemented in a variety of industries, such as electrical, water, oil, gas, data, and so forth. In implementations, based on information received from remote stations, automated or operator-driven supervisory commands can be transmitted to remote station control devices (e.g., field devices) of the industrial control system 100. The field devices of the industrial control system 100 can control local operations such as opening and closing valves and breakers, collecting data from sensor systems, and monitoring the local environment for alarm conditions.

SCADA systems can be used with industrial processes, including manufacturing, production, power generation, fabrication, and refining. SCADA system can also be used with infrastructure processes, including water treatment and distribution, wastewater collection and treatment, oil and gas pipelines, electrical power transmission and distribution, wind farms, large communication systems, and so forth. Further, SCADA systems can be used in facility processes for buildings, airports, ships, space stations, and the like (e.g., to monitor and control Heating, Ventilation, and Air Conditioning (HVAC) equipment and energy consumption). DCS systems are generally used in large campus industrial process plants, such as oil and gas, refining, chemical, pharmaceutical, food and beverage, water and wastewater, pulp and paper, utility power, mining, metals, and so forth. PLCs are typically used in industrial sectors and with critical infrastructures.

Figure 5:
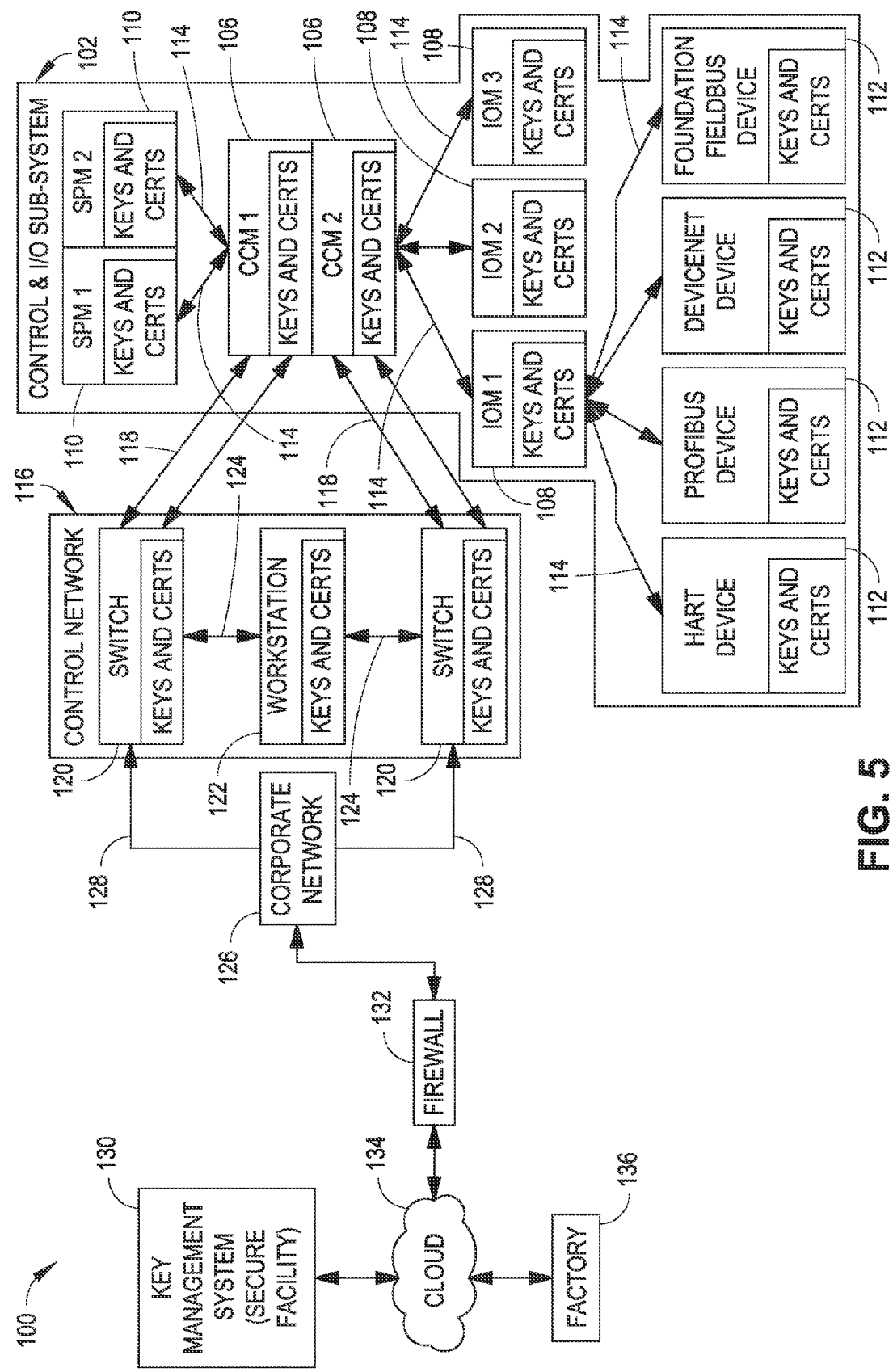
FIG. 5 is a conceptual block diagram further illustrating features of the secure industrial control system shown in FIG. 1 in accordance with example implementations of the present disclosure.

In embodiments, the industrial control system 100 includes a control and input/output (I/O) sub-system 102, as shown in FIGS. 1 and 5. The control and I/O sub-system 102 includes a plurality of industrial elements such as devices 104. In embodiments, the devices 104 may comprise one or more communications control modules (CCM) 106, and/or one or more input/output modules (IOM) 108. The term "input/output module" as used herein may encompass a module which receives inputs and/or provides outputs (e.g., an I/O module). Further, one or more of the devices 104 may comprise a power module, such as a smart power module (SPM) 110. Additionally, one or more of the devices 104 may be a field device 112 as discussed herein below. In embodiments, the plurality of devices 104 of the control and input/output sub-system are connected to each other via communications links 114.

As shown, the communications control modules 106 are communicatively coupled via communication links 114 to the power modules 110, for allowing communications and/or power signal transmission. In embodiments, each communications control module 106 is connected to each power module 110 and to each input/output module 108.

One or more input/output modules 108 are connected to (e.g., communicatively coupled with) the one or more field devices 112. The one or more input/output modules 108 may comprise input modules and/or output modules (e.g., may be configured for receiving inputs and/or providing outputs). The one or more field devices 112 may include an input instrument, such as a sensor, which may be used for functions such as measuring pressure in piping for a gas plant, a refinery, and so forth. In such instances, the input modules of the input/output modules 108 can be used to receive information from input instruments, such as the sensor, in the process or the field. The input/output modules 108 may be configured to convert analog data received from the sensor of the field device 112 to digital data (e.g., using Analog-to-Digital Converter (ADC) circuitry, and so forth). The power modules 110 are configured for supplying electrical power to the field devices 112 via the input/output modules 108.

The input/output modules 108, when configured as output modules, can be used to transmit instructions to output instruments of the field devices 112. For example, the field devices 112 may include an output instrument, such as a motor. In such implementations, the input/output modules 108 may be connected to the motor and configured to control one or more operating characteristics of the motor, such as motor speed, motor torque, and so forth. Further, the input/output modules 108 may be configured to convert digital data to analog data for transmission to the motor (e.g., using Digital-to-Analog (DAC) circuitry, and so forth). In embodiments, one or more of the input/output modules 108 may include a communications module configured for communicating via a communications sub-bus, such as an Ethernet bus, an H1 field bus, a Process Field Bus (PROFIBUS), a Highway Addressable Remote Transducer (HART) bus, a Modbus, and so forth. Further, two or more of the input/output modules 108 can be used to provide fault tolerant and redundant connections for the communications sub-bus.

The input/output modules 108 may be configured to collect data and control systems in applications including, but not necessarily limited to: industrial processes, such as manufacturing, production, power generation, fabrication, and refining; infrastructure processes, such as water treatment and distribution, wastewater collection and treatment, oil and gas pipelines, electrical power transmission and distribution, wind farms, and large communication systems; facility processes for buildings, airports, ships, and space stations (e.g., to monitor and control Heating, Ventilation, and Air Conditioning (HVAC) equipment and energy consumption); large campus industrial process plants, such as oil and gas, refining, chemical, pharmaceutical, food and beverage, water and wastewater, pulp and paper, utility power, mining, metals; and/or critical infrastructures.

The input/output modules 108 can be connected to the control and input/output sub-system 102 using one or more connectors. In embodiments, the communications link(s) 114 may be configured for use with any systems technology, such as a telecommunications network technology, computer network technology, process control systems technology, and so forth. The communications link(s) 114 may be implemented in a single, monolithic circuit board. However, this configuration is provided by way of example only and is not meant to be restrictive of the present disclosure.

Respective ones of the input/output module 108 can include one or more ports furnishing a physical connection to hardware and circuitry included with the input/output module 108, such as a printed circuit board (PCB), and so forth. The input/output modules 108 may also include an interface for connecting to other networks, including but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. The input/output modules 108 may further include a connection for connecting an input/output module 108 to a computer bus, and so forth.

The communications links 114 may be coupled with one or more communications control modules 106, which can be used as master devices for monitoring and controlling the input/output modules 108, and for connecting the input/output modules 108 together. For example, a communications control module 106 may update a routing table when an input/output module 108 is connected to the control and input/output sub-system 102 based upon a unique ID for the input/output module 108. Further, when multiple redundant input/output modules 108 are used, each communications control module 106 can implement mirroring of informational databases regarding the input/output modules 108 and update them as data is received from and/or transmitted to the input/output modules 108. In some implementations, two or more communications control modules 106 may be used to provide redundancy.

Data transmitted using communications links 114 may be packetized (e.g., discrete portions of the data may be converted into data packets comprising the data portions along with network control information, and so forth). The control and input/output sub-system 102 and/or communications links 114 may use one or more protocols for data transmission, including a bit-oriented synchronous data link layer protocol such as High-Level Data Link Control (HDLC). In embodiments, the control and input/output sub-system 102 and/or communications links 114 may implement HDLC according to an International Organization for Standardization (ISO) 13239 standard, or the like. Further, two or more communications control modules 106 can be used to implement redundant HDLC. However, it should be noted that HDLC is provided by way of example only and is not meant to be restrictive of the present disclosure. Thus, the control and input/output sub-system 102 may use other various communications protocols in accordance with the present disclosure.

The communications control modules 106 may be configured for exchanging information with components used for monitoring and/or controlling instrumentation connected to the communications links 114 via the input/output modules 108, such as one or more control loop feedback mechanisms/controllers. For example, a controller can be configured as a microcontroller/Programmable Logic Controller (PLC), a Proportional-Integral-Derivative (PID) controller, and so forth. One or more of the communications control modules 106 may include a network interface for connecting the control and input/output sub-system 102 to a controller via a network. In embodiments, the network interface may be configured as a Gigabit Ethernet interface for connecting the control and input/output sub-system 102 to a Local Area Network (LAN). Further, two or more communications control modules 106 can be used to implement redundant Gigabit Ethernet. However, it should be noted that Gigabit Ethernet is provided by way of example only and is not meant to be restrictive of the present disclosure. Thus, the network interface may be configured for connecting the control and input/output sub-system 102 to other various networks, including but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. Additionally, the network interface may be implemented using computer bus. For example, the network interface can include a Peripheral Component Interconnect (PCI) card interface, such as a Mini PCI interface, and so forth. Further, the network may be configured to include a single network or multiple networks across different access points.

One or more of the power modules 110 may include an AC-to-DC (AC/DC) converter for converting Alternating Current (AC) (e.g., as supplied by AC mains, and so forth) to Direct Current (DC) for transmission to a field device 112, such as a motor (e.g., in an implementation where the motor comprises a DC motor). Two or more power modules 110 can be used to provide redundancy. For example, two power modules 110 can be connected to each of the input/output modules 108 using a separate (e.g., redundant) power backplane for each power module 110. In embodiments, the power backplane(s) may be connected to one or more of the input/output modules using connectors/connector assemblies.

In embodiments, the control and input/output sub-system 102 may be implemented using a support frame. The support frame may be used to support and/or interconnect the communications control modules 106, the power modules 110, the communications links 114, the power backplane(s), and/or the input/output modules 108. For example, the communications links 114 may be comprised of a circuit board. The circuit board may be mounted to the support frame. Additionally, the connectors may be mounted to the support frame.

The secure industrial control system 100 further includes a control network 116. The control network 116 is communicatively coupled with the control and input/output sub-system 102 via communications links 118. The control network 116 may include one or more switches 120. In embodiments, the switches 120 are telecommunications devices that receive data (e.g., messages) from devices to which they are connected and selectively transmit the data to only a device for which the data is meant. The switches 120 are configured for connecting the communications control modules 106 to one or more workstations 122 of the control network 116 via communications links (118,124). In implementations, the workstations 122 may comprise microcomputers configured for technical or scientific applications. The workstations 122 may be connected to a local area network and may run multi-user operating systems. In embodiments, the workstations 122 may be mainframe computer terminals or personal computers (PCs) connected to a network. In implementations, the workstations 122 are connected to the control and input/output sub-system 102 via the switches 120.

As shown, the industrial control system 100 may include a first network 126. In embodiments, the first network 126 may be a corporate network. The corporate network may comprise a computer network made up of an interconnection of local area networks (LANs) within a limited geographical area. In examples, the switches 120 include network interfaces for connecting the switches 120 to the first network 126 via communications links 128. In implementations, the workstations 122 may be connected to (e.g., communicatively coupled with) the first network (e.g., corporate network) 126 via the switches 120. The workstations 122 collect information which can be used to generate/provide commands to field control devices, such as the input/output modules 108.

One or more components of the industrial control system 100, including the communications control modules 106; the input/output modules 108; the power modules 110; the field devices 112; the switches 120; and/or the workstations 122 may include and/or may be connected to a controller (e.g., a microcontroller). In implementations, one or more of the communications links (114, 118, 124, 128) may include and/or may be connected to a controller. For example, physical interconnect devices, such as cable assemblies, of the communications links (114, 118, 124, 128) may include and/or may be connected to a controller. In some implementations, all of the components and all physical interconnect devices (e.g., cable assemblies) connecting the components of the industrial control system 100 may each include controllers. In embodiments, the controller(s) connected to or included in the physical interconnect devices may be one-wire encryption chips, which allow for implementation of authentication between a component (e.g., an input/output module 108) and the physical interconnect device (e.g., cable assembly) connected to that component as discussed in more detail below. For example, microprocessor secure encrypted technology may be built into the cable assembly and keyed to a specific component of the industrial control system 100. This configuration provides security for the system 100 when a user installs (e.g., plugs) the cable assembly into a component which is not configured to be connected with that cable assembly. In embodiments, a one-wire serial key (e.g., one-wire embedded key) is implemented in one or more (e.g., each of) the physical interconnect devices. In further embodiments, actuators or valves that interconnect to the industrial control system 100 may include security credentials (e.g., keys, certificates).

Techniques for Providing Security in Industrial Control System(s)

The secure industrial control system 100 includes a security credential source 101, a security credential implementer 103, and the industrial elements of the industrial control system 100 (e.g., of the control and I/O subsystem 102). As noted, the industrial elements may include a control module (e.g., communications control module 106), an input/output module 108, and a power module (e.g., smart power module 110). The security credential source 101 is configured to generate unique security credentials (e.g., keys, certificates, etc.). The security credential implementer 103 is configured to provision the industrial elements with the unique security credential generated by the security credential source 101. For instance, the communications control module 106, the input/output module 108, and/or the smart power module 110 may each be provisioned with unique security credentials (e.g., keys and certificates). An authentication process for authenticating the industrial elements implemented in the industrial control system may be performed based upon the security credentials Communication between one or more of the components and/or physical interconnect devices (e.g., cable assemblies) of the industrial control system 100 may include an authentication process. The authentication process may be performed for authenticating a component and/or physical interconnect device implemented in the industrial control system 100. In implementations, the authentication process may utilize security credentials associated with the component and/or physical interconnect device for authenticating that component and/or physical interconnect device. For example, the security credentials may include encryption keys, certificates (e.g., public key certificates, digital certificates, identity certificates, security certificates, asymmetric certificates, standard certificates, non-standard certificates) and/or identification numbers. In embodiments, controllers (e.g., secure microcontrollers) which are included in/connected to the components and/or physical interconnect devices of the industrial control system 100 may be configured for performing the authentication process for promoting secure communication between the components and/or physical interconnect devices.

In implementations, one or more of the industrial elements (e.g., components and/or physical interconnect devices) of the industrial control system 100 are provisioned with their own unique security credentials. For example, one or more of the industrial elements of the industrial control system 100 are provisioned with their own unique sets of certificates, encryption keys and/or identification numbers when the industrial elements are manufactured (e.g., the individual sets of keys and certificates are defined at the birth of the industrial element). The sets of certificates, encryption keys and/or identification numbers are configured for providing/supporting strong encryption. The encryption keys may be implemented with standard (e.g., commercial off-the-shelf (COTS)) encryption algorithms, such as National Security Agency (NSA) algorithms, National Institute of Standards and Technology (NIST) algorithms, or the like.

Based upon the results of the authentication process, the industrial element being authenticated may be activated, partial functionality of the industrial element may be enabled or disabled within the industrial control system 100, complete functionality of the industrial element may be enabled within the industrial control system 100, and/or functionality of the industrial element within the industrial control system 100 may be completely disabled (e.g., no communication between that industrial element and other industrial elements of the industrial control system 100.

In embodiments, the keys, certificates and/or identification numbers associated with an industrial element of the industrial control system 100 may specify the original equipment manufacturer (OEM) of that industrial element. As used herein, the term "original equipment manufacturer" or "OEM" may be defined as an entity that physically manufactures the device (e.g., industrial element) and/or a supplier of the device such as an entity that purchases the device from a physical manufacturer and sells the device. Thus, in embodiments, a device may be manufactured and distributed (sold) by an OEM that is both the physical manufacturer and the supplier of the device. However, in other embodiments, a device may be distributed by an OEM that is a supplier, but is not the physical manufacturer. In such embodiments, the OEM may cause the device to be manufactured by a physical manufacturer (e.g., the OEM may purchase, contract, order, etc. the device from the physical manufacturer). Additionally, where the OEM comprises a supplier that is not the physical manufacturer of the device, the device may bear the brand of the supplier instead of brand of the physical manufacturer. For example, in instances where industrial elements (e.g., module) are associated with a particular OEM that is a supplier but not the physical manufacturer, the industrial element's keys, certificates and/or identification numbers may specify that origin. During authentication of an industrial element of the industrial control system 100, when a determination is made that an industrial element being authenticated was manufactured or supplied by an entity that is different than the OEM of one or more other industrial elements of the industrial control system 100, then the functionality of that industrial element may be at least partially disabled within the industrial control system 100. For example, limitations may be placed upon communication (e.g., data transfer) between that industrial element and other industrial elements of the industrial control system 100, such that the industrial element may not work/function within the industrial control system 100. When one of the industrial elements of the industrial control system 100 requires replacement, this feature may prevent a user of the industrial control system 100 from unknowingly replacing the industrial element with a non-homogenous industrial element (e.g., an industrial element having a different origin (a different OEM) than the remaining industrial elements of the industrial control system 100) and implementing the industrial element in the industrial control system 100. In this manner, the techniques described herein may prevent the substitution of industrial elements (which may furnish similar functionality) of other OEM's into a secure industrial control system 100 manufactured and/or supplied by the originating OEM (the OEM that originally supplied the industrial control system 100 to the user) in place of industrial elements manufactured and/or supplied by the originating OEM without the approval of the originating OEM.

In another instance, a user may attempt to implement an incorrectly designated (e.g., miss-marked) industrial element within the industrial control system 100. For example, the miss-marked industrial element may have a physical indicia marked upon it which falsely indicates that the industrial element is associated with a same OEM as the OEM of the other industrial elements of the industrial control system 100. In such instances, the authentication process implemented by the industrial control system 100 may cause the user to be alerted that the industrial element is counterfeit. This process may also promote improved security for the industrial control system 100 since counterfeit industrial elements are often a vehicle by which malicious software can be introduced into the industrial control system 100. In embodiments, the authentication process provides a secure air gap for the industrial control system 100, ensuring that the secure industrial control system is physically isolated from insecure networks.

Figure 4:
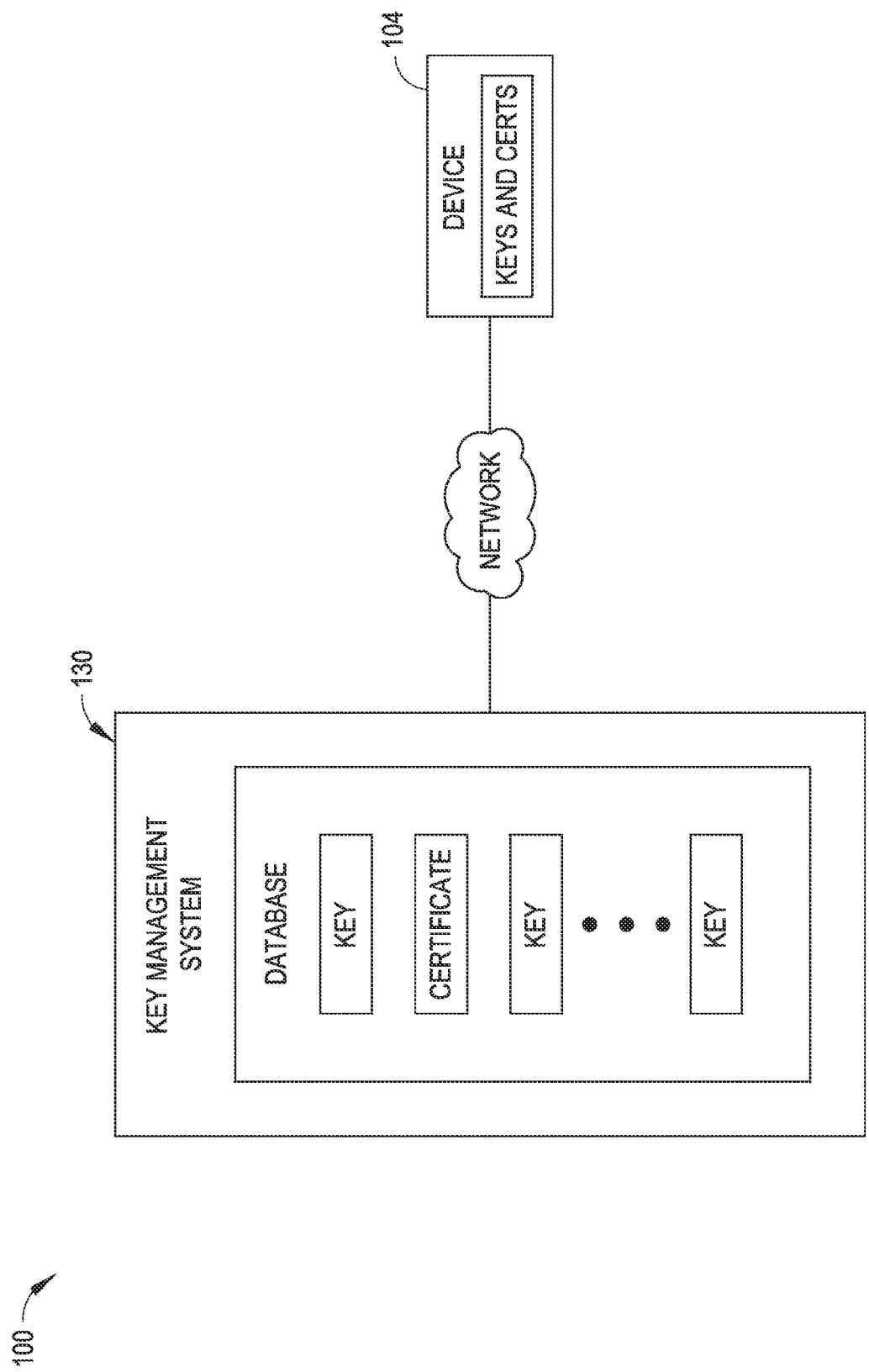
FIG. 4 is a conceptual block diagram illustrating aspects of the secure industrial control system shown in FIG. 1 in accordance with example implementations of the present disclosure.

In implementations, the secure industrial control system 100 includes a key management entity (e.g., key management system 130). As shown in FIG. 4, the key management system 130 may be configured for managing cryptographic keys (e.g., encryption keys) in a cryptosystem. This managing of cryptographic keys (e.g., key management) may include the generation, exchange, storage, use and/or replacement of the keys. For example, the key management system 130 is configured to serve as a security credentials source, generating unique security credentials (e.g., public security credentials, secret security credentials) for the industrial elements of the industrial control system 100. Key management pertains to keys at the user and/or system level (e.g., either between users or systems).

In embodiments, the key management system 130 comprises a secure entity such as an entity located in a secure facility). The key management system 130 may be remotely located from the control and input/output sub-system 102, the control network 116 and/or the corporate network 126. For example, a firewall 132 may separate the key management system 130 from the control and input/output sub-system 102, the control network 116 and/or the corporate network 126. In implementations, the firewall 132 may be a software or hardware-based network security system that controls ingoing and outgoing network traffic by analyzing data packets and determining whether the data packets should be allowed through or not, based on a rule set. The firewall 132 thus establishes a barrier between a trusted, secure internal network (e.g., corporate network 114, control network 106) and another network that is not assumed to be secure and trusted (e.g., cloud, Internet). In embodiments, the firewall 132 allows for selective (e.g., secure) communication between the key management system 130 and one or more of the control and input/output sub-system 102, the control network 116 and/or the corporate network 126. In examples, one or more firewalls 132 may be implemented at various locations within the industrial control system 100. For example, firewall(s) 132 may be integrated into switches 120 and/or workstations 122 of the control network 116.

The secure industrial control system 100 may further include one or more manufacturing entities (e.g., factories) 136. The manufacturing entities 136 may be associated with original equipment manufacturers (OEMs) for the industrial elements of the industrial control system 100. As shown, the key management system 130 may be communicatively coupled with the manufacturing entity (or entities) 136 via network 134 (e.g., a cloud. In implementations, when the industrial elements of the industrial control system 100 are being manufactured at the one or more manufacturing entities 136, the key management entity 130 may be communicatively coupled with (e.g., may have an encrypted communications pipeline to) the industrial elements. The key management entity 130 can utilize the communications pipeline for provisioning the industrial elements with security credentials (e.g., inserting keys, certificates and/or identification numbers into the industrial elements) at the point of manufacture. Further, when the industrial elements are placed into use (e.g., activated), the key management entity 130 may be communicatively coupled (e.g., via an encrypted communications pipeline) to each individual industrial element worldwide and may confirm and sign the use of specific code, revoke (e.g., remove) the use of any particular code, and/or enable the use of any particular code. Thus, the key management entity 130 may communicate with each industrial element at the factory 136 where the industrial element is originally manufactured (e.g., born), such that the industrial element is born with managed keys. A master database and/or table including all encryption keys, certificates and/or identification numbers for each industrial element of the industrial control system 100 may be maintained by the key management system 130. The key management entity 130 through its communication with the industrial elements is configured for revoking keys, thereby promoting the ability of the authentication mechanism to counter theft and re-use of components.

In implementations, the key management system 130 may be communicatively coupled with one or more of the control and input/output sub-system 102, the control network 116 and/or the corporate network 126 via network (e.g., cloud, Internet) 134 and firewall 132. For example, in embodiments, the key management system 130 may be a centralized system or a distributed system. Moreover, in embodiments, the key management system 130 may be managed locally or remotely. In some implementations, the key management system 130 may be located within (e.g., integrated into) the control network 116, the corporate network 126 and/or the control and input/output subsystem 102. The key management system 130 may provide management and/or may be managed in a variety of ways. For example, the key management system 130 may be implemented/managed: by a customer at a central location, by the customer at individual factory locations 136, by an external third party management company and/or by the customer at different layers of the industrial control system 100, and at different locations, depending on the layer.

Varying levels of security (e.g., scalable, user-configured amounts of security) may be provided by the authentication process. For example, a base level of security may be provided which authenticates the industrial elements and protects code within the industrial elements. Other layers of security can be added as well. For example, security may be implemented to such a degree that a component, such as a power module 110, may not power up without proper authentication occurring. In implementations, encryption in the code is implemented in the industrial elements, security credentials (e.g., keys and certificates) are implemented on the industrial elements. Security may be distributed (e.g., flows) through the industrial control system 100. For example, security may flow through the system 100 all the way to an end user, who knows what that module is designed to control in that instance. In embodiments, the authentication process provides encryption, identification of devices for secure communication and authentication of system hardware or software components (e.g., via digital signature).

the industrial elements of the industrial secure control system 100 are provisioned with unique security credentials and include controllers (e.g., microcontrollers) for implementing the above-referenced authentication process so that security is provided at multiple (e.g., all) communication levels within the secure industrial control system 100.

In implementations, the authentication process may be implemented to provide for/enable interoperability within the secure industrial control system 100 of industrial elements manufactured and/or supplied by different manufacturers/vendors/suppliers (e.g., OEMs). For example, selective (e.g., some) interoperability between industrial elements manufactured and/or supplied by different manufacturers/vendors/suppliers may be enabled. In embodiments, security credentials (e.g., keys) implemented during authentication may form a hierarchy, thereby allowing for different functions to be performed by different industrial elements of the industrial control system 100.

The communication links connecting the components of the industrial control system 100 may further employ data packets, such as runt packets (e.g., packets smaller than 64 bytes), placed (e.g., injected/stuffed) therein for providing an added level of security. The use of runt packets increases the level of difficulty with which outside information (e.g., malicious content such as false messages, malware (viruses), data mining applications, etc.) can be injected onto the communications links. For example, runt packets may be injected onto a communication link within gaps between data packets transmitted between a communications control module 106 and an input/output module 108 to hinder an external entity's ability to inject malicious content onto the communication link.

The secure industrial control system 100, including some or all of its components and physical interconnect devices, can operate under computer control. For example, a processor can be included with or in each controller to control components and physical interconnect devices and functions of the industrial control system 100 by using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the industrial control system 100. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

The processors provide processing functionality for the components and physical interconnect devices of the industrial control system 100 and can include any number of processors, micro-controllers, or other processing systems, and resident or external memory for storing data and other information accessed or generated by the secure industrial control system 100. Each processor can execute one or more software programs that implement techniques described herein. The processors are not limited by the materials from which they are formed or the processing mechanisms employed therein and, as such, can be implemented via semiconductor(s) and/or transistors (e.g., using electronic integrated circuit (IC) components), and so forth.

Memory can be included with or in each controller. The memory is an example of a tangible, computer-readable storage medium that provides storage functionality to store various data associated with operation of the industrial control system 100, such as software programs and/or code segments, or other data to instruct the processor(s), components, and physical interconnect devices of the industrial control system 100, to perform the functionality described herein. Thus, the memory can store data, such as a program of instructions for operating the industrial control system 100 (including its components and physical interconnect devices), and so forth. It should be noted that a wide variety of types and combinations of memory (e.g., tangible, non-transitory memory) can be employed. The memory can be integral with the processor, can comprise stand-alone memory, or can be a combination of both. The memory can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the system 100 and/or the memory can include removable integrated circuit card (ICC) memory, such as memory provided by a subscriber identity module (SIM) card, a universal subscriber identity module (USIM) card, a universal integrated circuit card (UICC), and so on.

A communications interface can be included with or in each controller. The communications interface is operatively configured to communicate with components and physical interconnect devices of the industrial control system 100. For example, the communications interface can be configured to transmit data for storage in the industrial control system 100, retrieve data from storage in the industrial control system 100, and so forth. The communications interface is also communicatively coupled with the processor to facilitate data transfer between components and physical interconnect devices of the industrial control system 100. It should be noted that while the communications interface is described as being included with or connected to a component and/or physical interconnect device of the industrial control system 100, one or more elements of the communications interface can be implemented as external elements communicatively coupled to component(s) and/or physical interconnect devices of the industrial control system 100 via a wired and/or wireless connection. Component(s) and/or physical interconnect devices of the industrial control system 100 can also comprise and/or connect to one or more input/output (I/O) devices (e.g., via the communications interface) including, but not necessarily limited to: a display, a mouse, a touchpad, a keyboard, and so on.

The communications interface and/or the processor can be configured to communicate with a variety of different networks including, but not necessarily limited to: a wide-area cellular telephone network, such as a 3G cellular network, a 4G cellular network, or a global system for mobile communications (GSM) network; a wireless computer communications network, such as a Wi-Fi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to be restrictive of the present disclosure. Further, the communications interface can be configured to communicate with a single network or multiple networks across different access points.

Example Processes for Providing Security in Industrial Control System(s)

Figure 6:
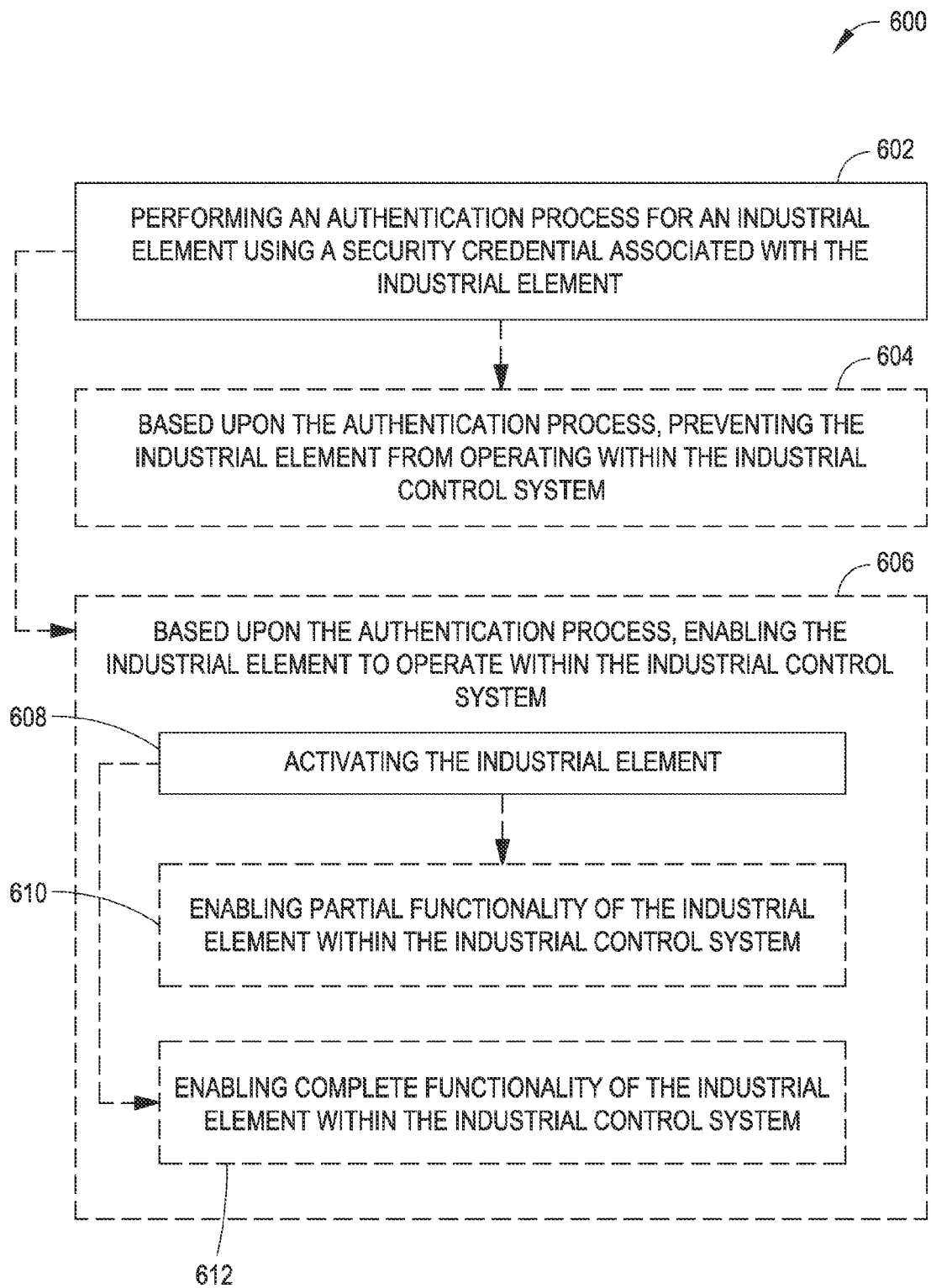
FIG. 6 is a flow diagram illustrating a method of authenticating a secure industrial element implemented in an industrial control system in accordance with example implementations of the present disclosure.

Referring now to FIG. 6, a process (method) 600 for authenticating an industrial element implemented in a secure industrial control system 100 is described. For example, the industrial element may be a module or a physical interconnect device (e.g., cable assembly) of the secure industrial control system 100. In implementations, the method 600 includes performing an authentication process for the industrial element using a security credential associated with the industrial element (Block 602). For example, a controller (e.g., microcontroller) connected to the industrial element may be configured to perform the authentication process. Based upon the authentication process, the industrial element is selectively enabled or prevented from operating within the industrial control system (Block 604). For example, when the authentication process determines that the industrial element being authenticated is compatible with (e.g., provided by a same OEM) other industrial elements of the industrial control system, the industrial element may be enabled so that the industrial element may operate within the system. However, when the authentication process determines that the industrial element being authenticated is not compatible with (e.g., is counterfeit, is associated with a different OEM than) other industrial elements of the industrial control system, the industrial element may be disabled from operating within the industrial control system. In some embodiments, enabling of the industrial element to operate within the industrial control system may further comprise activating the industrial element (Block 606); enabling partial functionality of the industrial element within the industrial control system (Block 608); enabling complete functionality of the industrial element within the industrial control system (Block 610), combinations thereof, and so forth.

Figure 7:
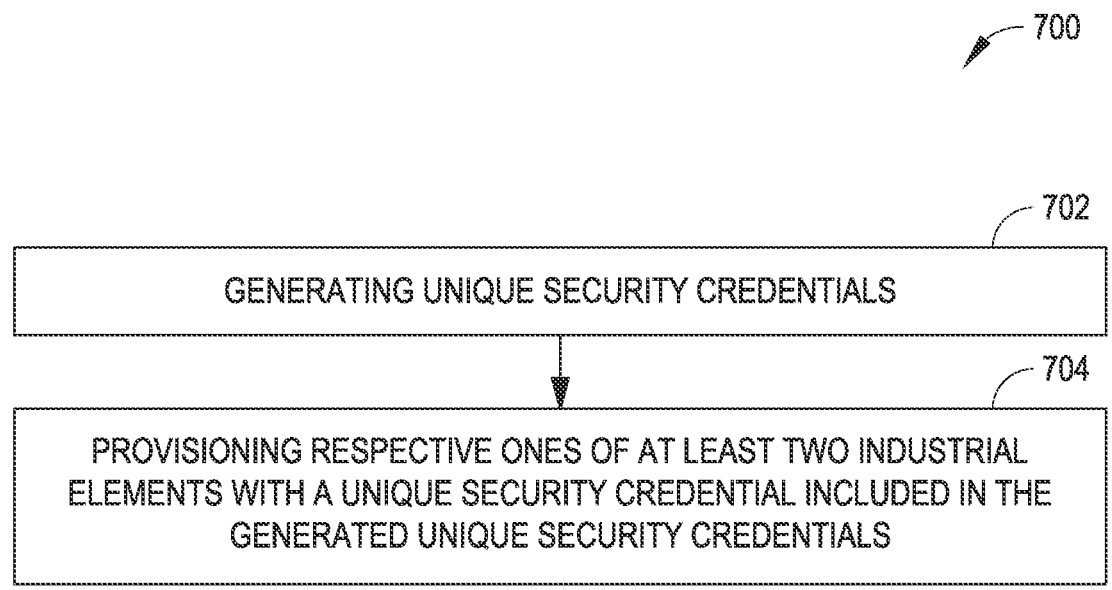
FIG. 7 is a flow diagram illustrating a method of provisioning security credentials to industrial elements of a secure industrial control system.

Referring now to FIG. 7, a process (method) 700 is described in accordance with an example implementation of the present disclosure. As shown, the method 700 includes generating unique security credentials (Block 702). For example, the unique security credentials may be generated by a key management system 130 of the secure industrial control system 100. The method 700 further includes provisioning respective ones of at least two industrial elements with a unique security credential included in the generated unique security credentials (Block 704). For example, the industrial elements may be provisioned with unique security credentials during manufacture of the industrial elements. In embodiments, the industrial elements (e.g., modules, cables, etc.) may be part of the secure industrial control system 100.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system or circuit. Further, elements of the blocks, systems, or circuits may be implemented across multiple integrated circuits. Such integrated circuits may comprise various integrated circuits including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block or circuit may be implemented using its software or firmware equivalent. In other instances, one part of a given system, block or circuit may be implemented in software or firmware, while other parts are implemented in hardware.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A secure industrial control system, comprising:
an input/output module provisioned with a first unique security credential, the input/output module including a first memory device and a first processor coupled to the first memory device, the input/output module being operable to receive industrial sensor information or send control information to an industrial actuator or motor; and
a control module provisioned with a second unique security credential, the second unique security credential indicating an original equipment manufacturer of the control module, the control module including a second memory device and a second processor coupled to the second memory device, the control module being configured to monitor and control the input/output module, wherein the control module is configured to at least partially disable operability of the input/output module based upon an authentication process performed with the first unique security credential and the second unique security credential when the authentication process indicates a second original equipment manufacturer of the input/output module that is different from the original equipment manufacturer of the control module.

2. The secure industrial control system as recited in claim 1, wherein the input/output module is configured to at least partially enable or disable operability of the control module based upon an authentication process performed with at least the second unique security credential.

3. The secure industrial control system as recited in claim 1, wherein the input/output module is configured to receive an authentication or revocation of the first unique security credential from at least one of a key management entity, the control module, or a second input/output device, and wherein the control module is configured to receive an authentication or revocation of the second unique security credential from at least one of a key management entity, a second control module, or the input/output device.

4. The secure industrial control system as recited in claim 1, further comprising:
a power module provisioned with a third unique security credential, the power module including a third memory device and a third processor coupled to the third memory device, the power module being configured to supply power for at least one of the input/output module or the control module, wherein the control module is configured to at least partially enable or disable operability of the power module based upon an authentication process performed with at least the third unique security credential.

5. The secure industrial control system as recited in claim 4, further comprising:
a physical interconnect device provisioned with a fourth unique security credential, the physical interconnect device being configured to couple at least two of the control module, the input/output module, and the power module, wherein at least one of the control module or the input/output module is configured to at least partially enable or disable operability of the physical interconnect device based upon an authentication process performed with at least the fourth unique security credential.

6. The secure industrial control system as recited in claim 1, wherein the control module is further configured to connect the input/output module to at least a second input/output module that is also monitored and controlled by the control module.

7. The secure industrial control system as recited in claim 1, further comprising:
a backplane that physically and communicatively couples the control module and the input/output module.

8. The secure industrial control system as recited in claim 1, wherein at least one of the first and second unique security credentials comprises a public security credential.

9. The secure industrial control system as recited in claim 1, wherein at least one of the first and second unique security credentials comprises a secret security credential.

10. The secure industrial control system as recited in claim 1, wherein at least one of the first and second unique security credentials comprises an encryption key.

11. The secure industrial control system as recited in claim 1, wherein at least one of the first and second unique security credentials comprises a certificate or an identification number.

12. A method of securing an industrial control system, comprising:
provisioning an input/output module with a first unique security credential, the input/output module being operable to receive industrial sensor information or send control information to an industrial actuator or motor;
provisioning a control module with a second unique security credential, the second unique security credential indicating an original equipment manufacturer of the control module, the control module being operable to monitor and control the input/output module; and
at least partially disabling operability of at least one of the control module or the input/output module based upon an authentication process performed between the control module and the input/output module with the first unique security credential and the second security credential when the authentication process indicates a second original equipment manufacturer of the input/output module that is different from the original equipment manufacturer of the control module.

13. The method as recited in claim 12, further comprising:
provisioning a power module a third unique security credential, the power module being operable to supply power for at least one of the input/output module or the control module; and
at least partially enabling or disabling operability of the power module based upon an authentication process performed with at least the third unique security credential.

14. The method as recited in claim 13, further comprising:
provisioning a physical interconnect device with a fourth unique security credential, the physical interconnect device being operable to couple at least two of the control module, the input/output module, and the power module; and
at least partially enabling or disabling operability of the physical interconnect device based upon an authentication process performed with at least the fourth unique security credential.

15. A secure industrial control system, comprising:
an input/output module provisioned with a first unique security credential, the first unique security credential indicating an original equipment manufacturer of the input/output module, the input/output module including a first memory device and a first processor coupled to the first memory device, the input/output module being operable to receive industrial sensor information or send control information to an industrial actuator or motor; and
a control module provisioned with a second unique security credential, the control module including a second memory device and a second processor coupled to the second memory device, the control module being configured to monitor and control the input/output module and to connect the input/output module to at least a second input/output module that is also monitored and controlled by the control module,
wherein the input/output module is configured to at least partially disable operability of the control module based upon an authentication process performed with the first unique security credential and the second unique security credential when the authentication process indicates a second original equipment manufacturer of the control module that is different from the original equipment manufacturer of the input/output module.

16. The secure industrial control system as recited in claim 15, wherein the input/output module is configured to receive an authentication or revocation of the first unique security credential from at least one of a key management entity, a second input/output module, or the control module.

17. The secure industrial control system as recited in claim 15, wherein the control module is configured to receive an authentication or revocation of the second unique security credential from at least one of a key management entity, a second control module, or the input/output module.

18. The secure industrial control system as recited in claim 15, further comprising:
a power module provisioned with a third unique security credential, the power module including a third memory device and a third processor coupled to the third memory device, the power module being configured to supply power for at least one of the input/output module or the control module, wherein the control module is configured to at least partially enable or disable operability of the power module based upon an authentication process performed with at least the third unique security credential.

19. The secure industrial control system as recited in claim 18, further comprising:
a physical interconnect device provisioned with a fourth unique security credential, the physical interconnect device being configured to couple at least two of the control module, the input/output module, and the power module, wherein at least one of the control module or the input/output module is configured to at least partially enable or disable operability of the physical interconnect device based upon an authentication process performed with at least the fourth unique security credential.

20. The secure industrial control system as recited in claim 18, further comprising:
a backplane that physically and communicatively couples the control module, the input/output module, and the power module.

* * * * *